United States Patent
Williams et al.

(10) Patent No.: US 9,652,348 B2
(45) Date of Patent: May 16, 2017

(54) DEBUGGING IN A DATA PROCESSING APPARATUS

(71) Applicant: ARM LIMITED, Cambridge (GB)

(72) Inventors: Michael John Williams, Cambridge (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 99 days.

(21) Appl. No.: 14/824,299

(22) Filed: Aug. 12, 2015

(65) Prior Publication Data

US 2016/0070630 A1 Mar. 10, 2016

(30) Foreign Application Priority Data

Sep. 10, 2014 (GB) .................................. 1416010.5

(51) Int. Cl.
*G06F 11/00* (2006.01)
*G06F 11/26* (2006.01)
(Continued)

(52) U.S. Cl.
CPC .......... *G06F 11/26* (2013.01); *G06F 9/30189* (2013.01); *G06F 11/2236* (2013.01); *G06F 11/3648* (2013.01)

(58) Field of Classification Search
USPC ........................................................ 714/33
See application file for complete search history.

(56) References Cited

U.S. PATENT DOCUMENTS

| 4,525,780 A | * | 6/1985 | Bratt | ................ | G01R 31/31850 |
| | | | | | 711/163 |
| 5,638,525 A | * | 6/1997 | Hammond | .......... | G06F 9/30043 |
| | | | | | 712/209 |

(Continued)

FOREIGN PATENT DOCUMENTS

| WO | 2012/038709 | 3/2012 |
| WO | 2012/101425 | 8/2012 |

OTHER PUBLICATIONS

Extended European Search Report dated Jan. 21, 2016 issued in EP 15181140.3, 8 pages.

(Continued)

*Primary Examiner* — Amine Riad
(74) *Attorney, Agent, or Firm* — Nixon & Vanderhye P.C.

(57) ABSTRACT

A data processing apparatus has a debug state in which processing circuitry 105 executes instructions received from the debug interface 115. Control changing circuitry 135 prohibits the execution of instructions in a predefined privilege mode when in the debug state if a control parameter has a predefined value. In response to a first exception being signalled while in the debug state, where the first exception is intended to be handled at the predefined privilege mode, and further in response to the control parameter having the predefined value, signalling circuitry 115 signals a second exception to be handled at a different privilege mode from the predefined privilege mode and sets information identifying a type of the first exception. Consequently, without having to enter the prohibited (predefined) privilege mode, the debugger 110 can be made aware of the first exception that would ordinarily be handled at the predefined, i.e. prohibited privilege mode.

17 Claims, 5 Drawing Sheets

(51) Int. Cl.
*G06F 11/36* (2006.01)
*G06F 9/30* (2006.01)
*G06F 11/22* (2006.01)

(56) References Cited

U.S. PATENT DOCUMENTS

| | | | | |
|---|---|---|---|---|
| 5,704,034 | A * | 12/1997 | Circello | G06F 11/3648 714/34 |
| 5,737,516 | A * | 4/1998 | Circello | G06F 11/3648 714/35 |
| 5,828,824 | A * | 10/1998 | Swoboda | G01R 31/31857 714/25 |
| 6,052,774 | A * | 4/2000 | Segars | G06F 11/3656 712/200 |
| 6,065,106 | A * | 5/2000 | Deao | G01R 31/31705 712/227 |
| 6,557,116 | B1 * | 4/2003 | Matt | G06F 11/3656 714/27 |
| 6,691,251 | B2 * | 2/2004 | Wong | G06F 11/261 703/27 |
| 6,751,751 | B1 * | 6/2004 | Murray | G06F 11/364 710/15 |
| 6,757,846 | B1 * | 6/2004 | Murray | G06F 11/362 710/48 |
| 6,981,178 | B2 * | 12/2005 | Nardini | G06F 11/3656 710/260 |
| 7,020,768 | B2 * | 3/2006 | Swaine | G06F 9/3802 712/227 |
| 7,117,284 | B2 * | 10/2006 | Watt | G06F 9/4812 710/261 |
| 7,127,639 | B2 * | 10/2006 | Agarwala | G06F 11/348 703/23 |
| 7,305,712 | B2 * | 12/2007 | Watt | G06F 9/30123 712/244 |
| 7,325,083 | B2 * | 1/2008 | Watt | G06F 9/4812 710/261 |
| 7,383,587 | B2 * | 6/2008 | Watt | G06F 21/74 710/261 |
| 7,661,105 | B2 * | 2/2010 | Watt | G06F 9/4812 710/261 |
| 7,949,866 | B2 * | 5/2011 | Watt | G06F 9/4812 712/229 |
| 7,984,352 | B2 * | 7/2011 | Greb | G01R 31/31705 712/227 |
| 9,336,122 | B2 * | 5/2016 | Kilzer | G06F 11/3636 |
| 2003/0005415 | A1 * | 1/2003 | Bates | G06F 11/362 717/129 |
| 2005/0027972 | A1 | 2/2005 | Harrington et al. | |
| 2006/0048099 | A1 | 3/2006 | Templin et al. | |
| 2008/0005546 | A1 * | 1/2008 | Wang | G06F 9/3009 712/244 |
| 2008/0082802 | A1 | 4/2008 | Muramatsu et al. | |
| 2009/0049220 | A1 * | 2/2009 | Conti | G06F 13/24 710/267 |
| 2009/0157936 | A1 * | 6/2009 | Goss | G06F 1/3203 710/264 |
| 2012/0079458 | A1 | 3/2012 | Williams et al. | |
| 2014/0208171 | A1 * | 7/2014 | Bariska, Jr. | G06F 11/0754 714/47.2 |
| 2015/0020211 | A1 * | 1/2015 | Lai | G06F 21/52 726/27 |
| 2016/0092382 | A1 * | 3/2016 | Anvin | G11C 7/1072 710/269 |
| 2016/0124835 | A1 * | 5/2016 | Davis | G06F 11/366 714/38.1 |

OTHER PUBLICATIONS

Coding Horror: "Rethrowing Exceptions" Jul. 22, 2004, retrieved Jan. 7, 2016 from http://blog.codinghorror.com/rethrowing-exceptions/ pp. 1-7.

Search Report for GB 1416010.5, mailed Mar. 13, 2015, 3 pages.

* cited by examiner

DEBUGGING IN A DATA PROCESSING APPARATUS

This application claims priority to GB Patent Application No. 1416010.5 filed 10 Sep. 2014, the entire contents of which is hereby incorporated by reference.

The present disclosure is concerned with data processing apparatuses, particularly data processing apparatuses that receive instructions from a debugger.

In some data processing apparatuses there are a number of different privilege modes (execution modes). The processing circuitry may operate in one of these privilege modes at any one time. For example, when handling operations of an operating system, the processing circuitry may operate at a higher level of privilege, which grants direct access to hardware devices or memory. Conversely, when executing software that executes under the operating system, the processing circuitry may operate in a less privileged mode, which only allows access to regions of memory that have been explicitly allocated to that software.

A debugger can be used to cause processing circuitry to halt its normal execution (e.g. of instructions retrieved from memory) and instead execute one or more directly injected instructions. These injected instructions can, for example, be used to set or access a value held in memory. Accordingly, the behaviour of a data processing apparatus, or software that is executed by the data processing apparatus can be observed and tested. In some cases, it is desirable to prevent the processing circuitry from entering the higher privilege mode while the debugger is in use. This can limit a user's ability to exploit the higher privilege mode of the processing circuitry—for example, by injecting instructions that cause the processing circuitry (in its higher privilege mode of operation) to access memory that has been allocated to other (possibly proprietary) applications.

However, difficulties can arise when the execution of an injected instruction causes an exception to be raised. Ordinarily, an exception may be handled by software that runs at a higher level of privilege. However, if the processing circuitry is prevented from entering that higher privilege mode while debugging then the data processing apparatus may be unable to respond to or even notify a user of the raised exception. This is particularly problematic given that a debugger may commonly be employed in order to find faults with a data processing apparatus or its software.

In accordance with one aspect there is provided an apparatus comprising: a debug interface to receive instructions from a debugger; processing circuitry to, in a debug state, execute instructions received from the debug interface; control circuitry to, if a control parameter has a predefined value, prohibit execution of instructions in a predefined privilege mode while in the debug state; and signalling circuitry to, in response to a first exception to be handled at the predefined privilege mode being signalled while in the debug state and the control parameter having the predefined value, signal a second exception to be handled at a different privilege mode, and to set information identifying a type of the first exception.

In accordance with a second aspect there is provided a method of operating processing circuitry having a debug state for executing instructions received from a debug interface, wherein, if a control parameter has a predefined value, the processing circuitry is prohibited from executing instructions in a predefined privilege mode while in the debug state, the method comprising the steps: receiving a signal indicating that a first exception to be handled at the predefined privilege mode has been raised; if said signal indicating that the first exception has been raised is received when the processing circuitry is in the debug state and the control parameter has the predetermined value, signalling a second exception to be handled at a different privilege mode; and setting information identifying a type of the first exception.

In accordance with a third aspect there is provided an apparatus comprising: a debug interface means for receiving instructions from a debugger means; processing means for, in a debug state, executing instructions received from the debug interface means; control means for prohibiting execution of instructions in a predefined privilege mode while in the debug state if a control parameter has a predefined value; and signalling means for signalling, in response to a first exception to be handled at the predefined privilege mode being signalled while in the debug state and the control parameter having the predefined value, a second exception to be handled at a different privilege mode, and setting information identifying a type of the first exception.

Further aspects, features and advantages of the present technique will be apparent from the following description of examples, which is to be read in conjunction with the accompanying drawings, in which.

Figure 1:
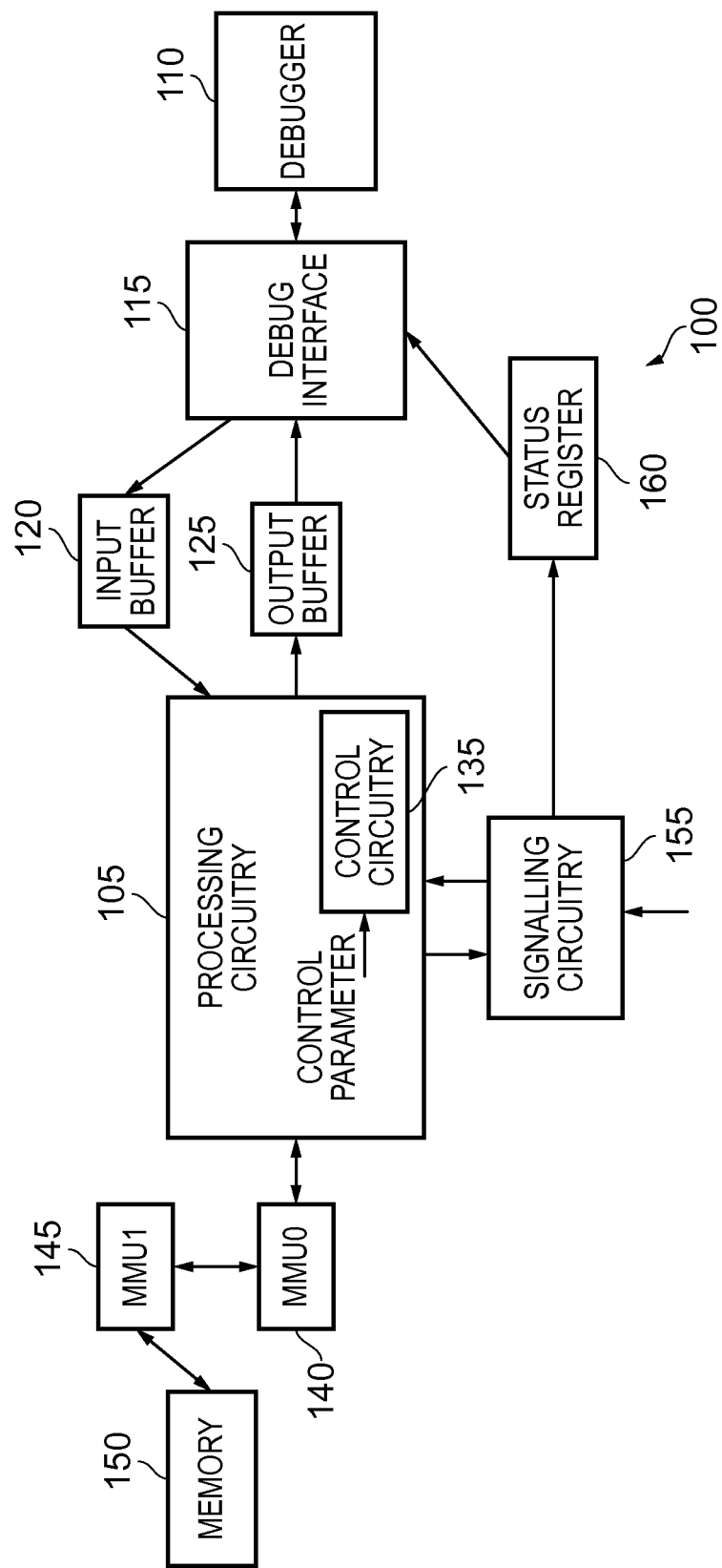
FIG. 1 is a schematic illustrating circuitry in accordance with one embodiment.

A debug interface is used to receive instructions from a debugger, the instructions received from the debug interface being executed by processing circuitry when the processing circuitry is in a debug state. Control circuitry is used to control the processing circuitry such that debugging (execution of debug instructions) can be prevented from taking place while the processing circuitry is in the predefined privilege mode, in dependence on a control parameter. The control circuitry can be a dedicated circuit, a circuit forming part of the processing circuitry, or even be the processing circuitry itself. When a first exception is raised that is intended to be handled at the predefined privilege mode and if the processing circuitry is in the debug state and if the control parameter has the predefined value such that the processing circuitry is prohibited from changing to that predefined privilege mode to handle the exception, then the signalling circuitry signals a second exception. The second exception is to be handled at a different privilege mode from the predefined privilege mode.

Additionally, information identifying a type of the first exception that was raised is also set. Accordingly, the processing circuitry is able to enter the different privilege mode and thereby provide a response to the first exception being raised. Using the set information, the debugger can be made aware of the first exception. In this way, even if it is not possible to rectify the situation that caused the first exception to be raised, it is possible to notify the debugger that the first exception occurred.

If the control parameter has the predefined value and if the processing circuitry is in the debug state, the control circuitry prohibits the processing circuitry from changing to the predefined privilege mode. In this way, the execution of instructions in the predefined privilege mode while the apparatus is simultaneously in a debug state is prevented by prohibiting the processing circuitry from entering the predefined privilege mode when the debug state is active.

If the control parameter has the predefined value and if the processing circuitry is in the predefined privilege mode, the control circuitry prohibits the processing circuitry from entering the debug state. In this way, the execution of instructions in the predefined privilege mode while the apparatus is simultaneously in a debug state is prevented by prohibiting the processing circuitry from entering the debug mode when the processing circuitry is in the predefined privilege mode.

The predefined privilege mode may be at a higher level of privilege than the different privilege mode. Accordingly, by setting information that identifies the type of the first exception, the processing circuitry does not need to enter the higher privilege mode in order for information identifying the type of the first exception to be made available (for example to the debugger). Hence, the security of the system may be maintained. Note that even if the predefined privilege mode is at a higher level of privilege than the different privilege mode, this does not imply that there is necessarily a strict hierarchy of modes. The higher privilege mode may be any mode which is more privileged than the different privilege mode.

There are a number of ways in which the information identifying the type of the first exception can be set. In some embodiments, a status register is used to store the information identifying the type of the first exception with the status register being accessible to the debug interface. Accordingly, a debugger may acquire the information identifying the type of the first exception via the debug interface. In other embodiments, the value of the status register may not be directly visible to the debugger, but may be accessible to the debug interface via debug instructions issued through the debug interface, which when executed by the processing circuitry cause the value in the status register to be written out through the debug interface.

In some embodiments, the information identifying the type of the first exception comprises a value corresponding to an exception that could not otherwise occur in the debug state. For example, the identifier of a debug exception generated in response to a debug event. Such an exception cannot normally occur in the debug state since, when in the debug state, further debug events do not occur. Using such values can be efficient, since it is not necessary to allocate a new identifier to represent the fact that an unhandled exception occurred.

The first exception may relate to a memory fault. For example, the first exception may relate to a memory translation fault. A memory translation fault may occur, for example, as a consequence of a failed translation from a virtual memory address to a physical memory address, e.g. due to insufficient access permissions for accessing the particular region of memory being targeted.

In some embodiments, the first exception is raised as a result of attempting a second translation from an intermediate address to a physical address after having performed a first translation from a virtual address to the intermediate address. Such a situation can arise, for example, where a hypervisor is used. For example, a user application may request access to a virtual memory address. The virtual memory address can be translated into a physical address under control of the guest operating system. However, since the guest operating system is not the host operating system (or hypervisor), the guest operating system does not provide a physical memory address and instead provides a "physical memory address" that is actually virtual. This virtual physical address is an example of an intermediate address. A second translation is then performed from the intermediate address to the physical address and this would generally be carried out under control of the hypervisor or host operating system, which has direct access to the physical memory.

In such a configuration, the execution of a user application may be halted in order to begin debugging and a debugger injects an instruction that accesses memory. This may cause a "second translation exception" to be raised. However, since the apparatus is in the debug state then if the control parameter has the predefined value, then the processing circuitry may be prohibited from changing to a privilege mode where the second translation exception can be handled. The inventors of the present technique have realised that this is suboptimal, since the debugger would not then be made aware of the exception. Accordingly, by signalling a second exception that is to be handled at a different privilege mode from the predefined privilege mode that the processing circuitry is prohibited from entering, and by setting information identifying a type of the first exception (i.e. the second translation exception), it may be possible to at least notify the debugger of the nature of the exception that has occurred.

The apparatus may comprise a first memory management unit to perform the first translation based on first configuration data set by the processing circuitry in response to software executing at a less privileged mode than the predefined privilege mode; and a second memory management unit to perform the second translation based on second configuration data set by the processing circuitry in response to software executing at the predefined privilege mode. In other embodiments, there may be a single memory management unit performing both operations based on both sets of configuration data. In particular, the memory management unit may perform caching of results in a Translation Lookaside Buffer, and this might cache the result of either translation, or the combined result, or both.

The first configuration data and the second configuration data may be set by the processing circuitry (e.g. in response to software) in order to indicate a set of permissions associated with particular blocks of memory. In this manner, it may be possible to indicate that particular software applications have different levels of access to different sections of memory. An attempt to access an area of memory in such a way that the permissions would be violated may cause a memory fault to occur.

The predefined privilege mode may be a hypervisor privilege mode and the different privilege mode may be a guest operating system privilege mode. The term "hypervisor" privilege mode is intended to cover both the use of a hypervisor and a host operating system. A hypervisor or host operating system may thereby enable a number of guest operating systems to execute directly under it. Each guest operating system may provide a virtualised environment to one or more user applications that execute under the guest operating system. Of course, it will be appreciated that a hypervisor system may include a number of further privilege modes.

A hypervisor system may provide a number of situations in which parts of the memory are restricted to particular pieces of software. For example, a guest operating system may not permit one application access to sections of memory that are allocated to another application. However, the guest operating system itself, together with the hypervisor, may be able to access all those areas of memory.

Similarly, a section of memory allocated to one guest operating system may not be accessible to by another guest operating system or its applications.

Other privilege models may also be used. For example, one or more "host applications" may execute directly under the hypervisor rather than under a guest operating system that executes under the hypervisor. With no guest operating system to manage the host applications, exceptions cannot be handled by a guest operating system. Furthermore, there may be security issues related to handling the exceptions at the hypervisor privilege mode. Accordingly, the predefined privilege mode may include both the hypervisor execution mode and a mode in which such host applications execute (but may not include modes in which other software executes).

In response to both the processing circuitry being in the debug state and the control parameter not having the predefined value the processing circuitry may be allowed to enter the predefined privilege mode. Accordingly, it may be possible to enable debugging to take place at the same time that the processing circuitry is in the hypervisor privilege mode, as long as the control parameter has a value other than the predefined value.

The signalling circuitry may, in response to a third exception to be handled at the predefined privilege mode being signalled, the processing circuitry being in the debug state, and the control parameter having the predefined value, signal a fourth exception to be handled at the different privilege mode, and not set information identifying the type of the third exception. For some exceptions, it may be acceptable to simply signal the fourth exception to be handled at the different privilege mode. In other words, it may not be necessary to set information identifying the type of the third exception. This may be the case, for example, where an exception is raised at the predefined privilege mode but that exception can also be handled at the different privilege mode. In such situations, it may not be necessary to set information identifying the type of the third exception, since software running at the different privilege mode may be able to determine the type of the exception by itself.

FIG. 1 shows an apparatus 100 in accordance with one embodiment. The apparatus includes processing circuitry 105, which may for example be a central processing unit (CPU). The processing circuitry 105 receives one or more instructions from a debugger 110. The debugger 110 may, for example, execute on a different data processing apparatus. The instructions are received from the debugger 110 via a debug interface 115, which is connected to the processing circuitry 105 via an input buffer 120. In other words, the debugger 110 transmits instructions to the debug interface 115, which stores the instructions in the input buffer 120. The processing circuitry 105 can then query the input buffer 120 in order to access the instructions. In some cases, if the instructions are executed by the processing circuitry 105, a result may be stored in an output buffer 125. The output buffer 125 can be queried by the debugger 110 via the debug interface 115. In this way, a result of executing a particular instruction may be sent from the processing circuitry 105 back to the debugger 110. This allows a user to determine the effect of executing a particular instruction that was inserted/injected by the debugger 110.

The processing circuitry 105 may run in one or more different privilege modes (execution modes). What actions the processing circuitry 105 may take may depend on the current mode of the processing circuitry 105. For example, the particular mode may restrict the actions that may be taken by software currently executing on the processing circuitry 105. Accordingly, by changing the mode of the processing circuitry 105 it may be possible to execute multiple pieces of software, each with different privileges.

In the embodiment illustrated in FIG. 1, control circuitry 135 is provided to prevent the execution of instructions in a higher level of privilege of execution while debugging is occurring. In particular, in dependence on a control parameter, the control circuitry prohibits the processing circuitry 105 from entering a predefined privilege mode while it is in a debug state and from entering a debug state while it is at the predefined privilege mode. Accordingly, a user is inhibited from causing the execution of instructions that could cause the security of the apparatus 100 to be reduced. For example, a user may be inhibited from executing instructions that cause private or secret data to be accessed and returned to the debugger. Similarly, the user may be inhibited from disrupting data used by the processing circuitry 105. The control parameter is able to disable these prohibitions. In particular, the prohibitions are in effect while the control parameter has a predefined value (e.g. while the control parameter is asserted).

The processing circuitry 105 uses memory management units 140, 145 in order to access a memory 150. By using memory management units 140, 145, it is possible to not only translate a virtual address into a physical address, but also manage a set of permissions on either the virtual address or the physical address, in order to ensure that only particular software is able to access particular areas of memory 150. Permissions may be set in order to allocate a region of memory (which may be defined by a start address and either an end address or a particular length) to particular software. That particular software (and any software under which the particular software executes—such as a guest operating system or a hypervisor) may access that region of memory freely. However, other software may be assumed to have no access to that region of memory. It will be appreciated that there are a number of different ways in which permissions may be set for particular regions of memory. Other mechanisms other than those explicitly explained herein will be apparent to the skilled person.

The apparatus 100 also comprises signalling circuitry 155. The signalling circuitry 155 (e.g. an exception controller) may be used in order to signal an exception to the processing circuitry 105. An exception may be signalled by the signalling circuitry 155 in response to an external source, in response to the memory management units 140, 145, and in response to the processing circuitry 105 itself. When an exception is signalled, the exception may be handled by software executing on the processing circuitry 105. Depending on the nature of the exception (i.e. the type of exception that has been raised), the exception may be handled by software executing at a particular privilege mode on the processing circuitry 105. For example, in the case of an external abort, an interrupt, a stage two fault, or an instruction trap, the exception may have to be handled by software running at the highest level of privilege, such as a hypervisor or host operating system. However, as previously discussed, the control circuitry 135 may prohibit the processing circuitry 105 from entering a particular privilege mode if, for example, while it is in a debug state. Accordingly, a situation may arise in which the processing circuitry 105 is prohibited from entering the privilege mode necessary in order to respond to an exception that has been raised. In some cases, it may be possible to reroute the exception, so that it is handled at a lower privilege mode, the lower privilege mode being permitted by the control circuitry 135.

When debugging occurs, the processing circuitry 105 halts the execution of instructions that are acquired from memory 150 and instead executes instructions that are injected by the debugger 110. In many cases, therefore, it will be sufficient merely to indicate that an exception has been raised. In other words, the full exception handling routine provided by software that executes at the higher privilege mode of execution need not be executed. Accordingly, the process of rerouting an exception in order to indicate that an exception has occurred, may be sufficient. In particular, it may allow a user of the debugger 110 to determine that a particular exception has occurred as a result of executing the most recent instruction injected by the debugger 110, even if the full exception handling routine is not executed.

However, for some exceptions, such rerouting is not sufficient. A stage two fault is a type of memory translation fault. The stage two fault is a type of memory fault caused by the second of two memory translations. In a first translation, a virtual address is translated to an intermediate address and in a second translation, the intermediate address is translated to a physical address. For example, the first translation may be based on first configuration data in the first memory management unit 140 set by the processing circuitry in response to software executing at a less privileged mode (such as a guest operating system), and the second translation may be based on second configuration data in the second memory management unit 145 set by the processing circuitry in response to software executing at a higher privilege mode. The stage two fault relates to the occurrence of a fault during the second translation. Since the second translation is based on second configuration data set by the processing circuitry in response to software executing at a higher privilege mode of execution (such as a hypervisor), it is most appropriate when not in a debug state for that specific software (e.g. the hypervisor) to handle the exception when it is raised. A further problem may arise, in that, in rerouting the exception to the less privileged mode of execution, the debugger 110 may incorrectly determine that the exception was a stage one fault, i.e. a fault that occurred as a result of a translation based on first configuration data in the first memory management unit 140. In the embodiment shown in FIG. 1, this problem is ameliorated by the signalling circuitry 155 signalling a second exception to be handled at the less privileged mode, and also setting information identifying a type of the first exception (the stage two fault) in a status register 160. This special "syndrome" value is based on a value that could not otherwise occur when in a debug state. For example, the information identifying the type of the first exception may comprise an identifier of a debug exception generated in response to a debug event. Since, in the scenario being described, the processing circuitry 105 is already in a debug state, it would not ordinarily be possible for a debug exception to be raised because further debug events do not occur in the debug state. By reading the value of the status register 160 via the debug interface 115, the debugger 110 is able to detect this special value and also to detect the raised stage one fault in order to determine that a stage two fault occurred.

Figure 2:
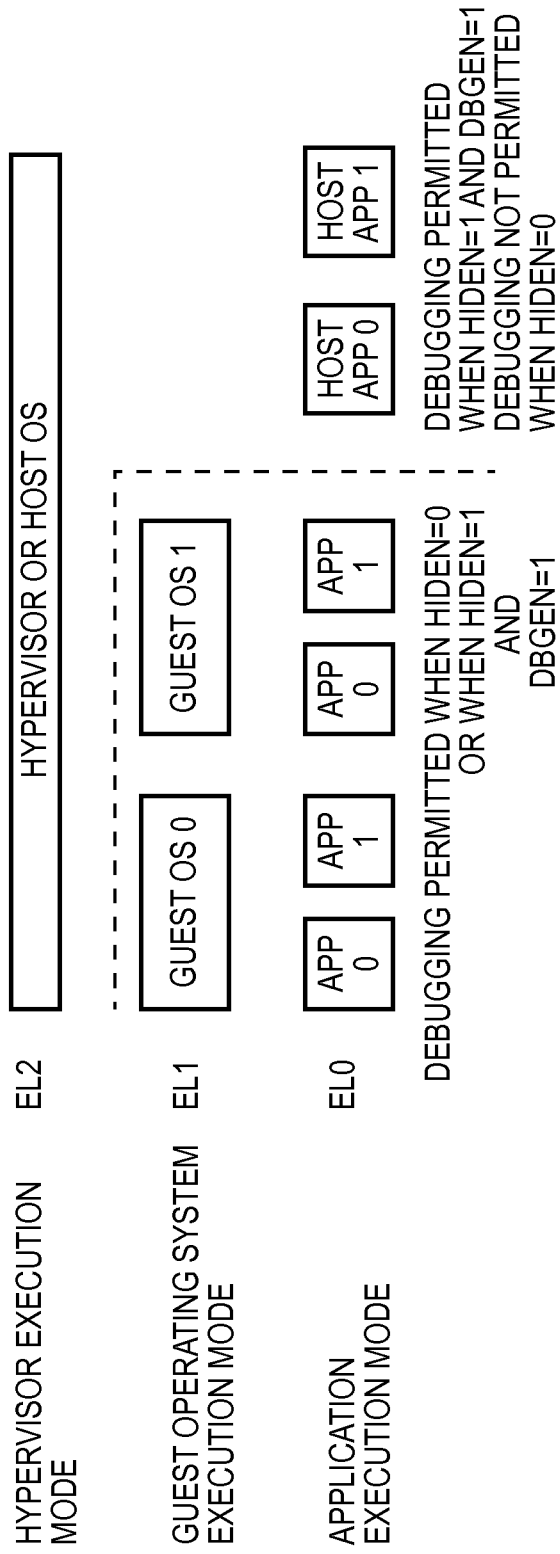
FIG. 2 illustrates a relationship between different privilege modes in accordance with one embodiment.

FIG. 2 illustrates an example relationship between different software that may execute in the data processing apparatus 100 in accordance with one embodiment. A hypervisor (or a host operating system) executes in privilege mode EL2. Under the hypervisor, a number of guest operating systems reside, executing at privilege mode EL1. A number of applications then execute under each guest operating system at privilege mode EL0. Additionally, a number of host applications run directly under the hypervisor in privilege mode EL0. In this example, the privilege modes are hierarchical in that software executing in the privilege mode EL2 has all the privileges of the software that executes in privilege mode EL1, which has all the privileges of the software that executes in privilege mode EL0. The hypervisor runs at the most privileged level (EL2) and the applications run at the least privileged level (EL0). The hypervisor privilege mode may therefore correspond with the predefined privilege mode that the processing circuitry 105 is prohibited from entering during a debug state. Other arrangements of privilege modes (e.g. those that are not hierarchical) are also possible.

FIG. 2 illustrates the effect of a hypervisor mode debug enable signal HIDEN, which is an example of a control parameter. In the example of FIG. 2, a debug enable signal DBGEN controls whether entry to the debug state is permitted. The signal HIDEN further controls whether or not execution in the predefined privilege mode (comprising a mode in which the hypervisor and host applications execute) is permitted at the same time as debugging. In other words, when HIDEN is asserted (equal to 1), debugging is permitted at the same time that the processing circuitry executes the hypervisor or the associated host applications that execute directly under the hypervisor. If HIDEN is de-asserted (equal to 0), then debugging is not permitted while the processing circuitry is executing the hypervisor or the host applications. This is achieved, in part, by preventing the processing circuitry from changing its privilege mode to a mode where the hypervisor or host applications can execute while in a debug state and also by preventing the processing circuitry from acquiring a debug state while the processing circuitry is in a privilege mode in which it can execute the hypervisor or the host applications. As long as DBGEN is asserted (equal to one), debugging of other applications, together with any guest operating systems, is permitted regardless of the value of HIDEN, i.e. regardless of whether or not the control parameter has the predefined value. When DBGEN is de-asserted (equal to 0) then debugging is not permitted at any privilege level.

Figure 3:
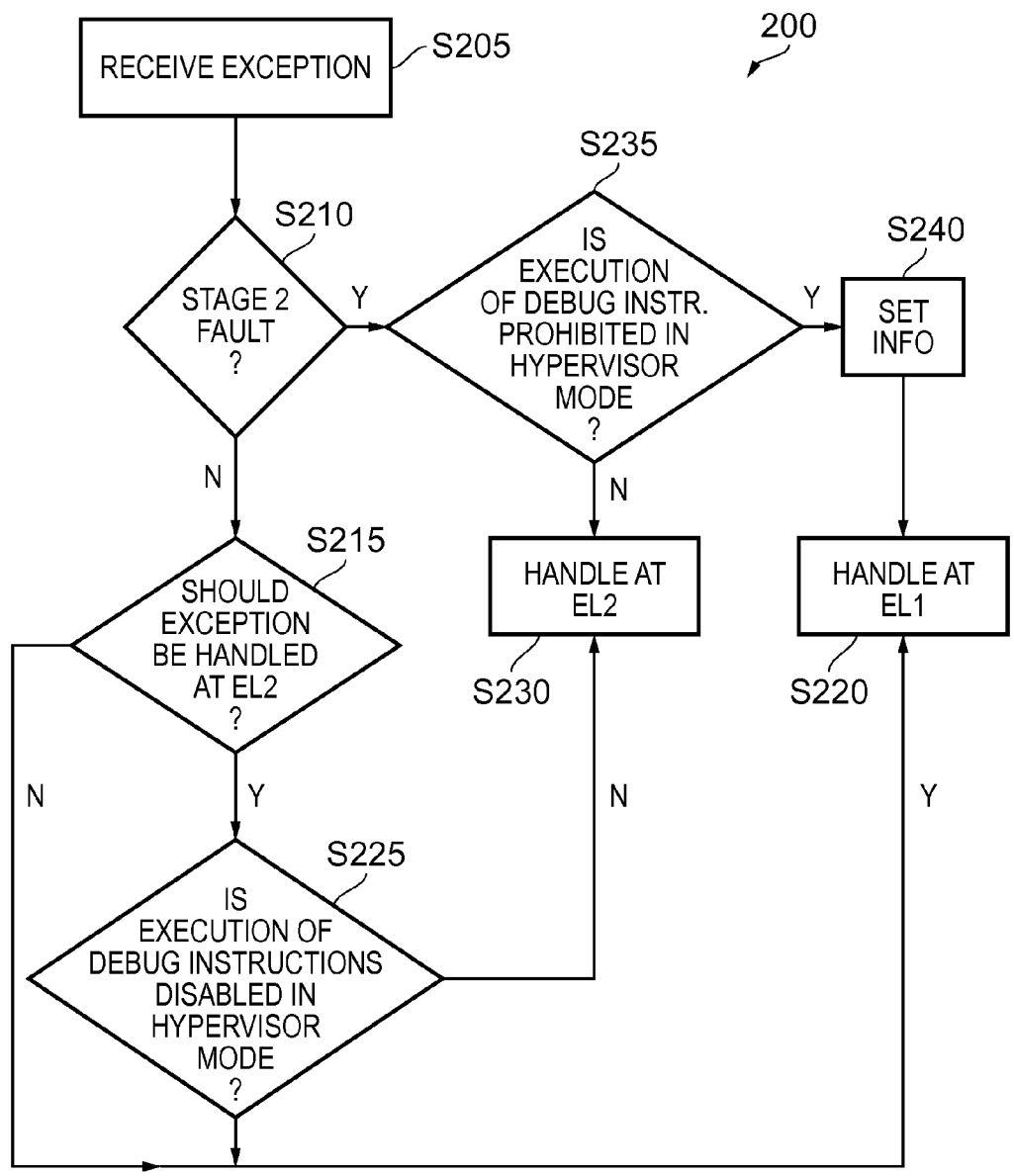
FIG. 3 is a flow chart illustrating the effect of control parameter on a received exception in accordance with one embodiment.

FIG. 3 illustrates a flow chart 200 indicating the process of receiving and responding to an exception when the processing circuitry 105 is in a debug state in accordance with one embodiment.

The process begins at step S205 where an exception is received. At step S210, it is determined whether or not the exception corresponds to a stage two fault. If the exception does not correspond with a stage two fault, then at step S215 it is determined whether or not the exception should be handled at privilege mode EL2. If not, then the flow proceeds to step S220 where the exception is handled at privilege mode EL1. In other words, this situation arises if there is no reason to change the level at which the exception should occur, and the exception would ordinarily occur at privilege mode EL1.

Alternatively, if at step S215 it is determined that the exception should be handled at privilege mode EL2 then at step S225, it is determined whether or not execution of debug instructions is permitted when in the hypervisor execution mode. If such execution is permitted (i.e. HIDEN=1), then flow proceeds to step S230 where the exception is handled at privilege mode EL2. In other words, if the exception is to be handled at privilege mode EL2, and if execution at privilege mode EL2 is permitted, then the exception is indeed handled at privilege mode EL2.

Alternatively, if at step S225, execution of debug instructions while in EL2 is not permitted (i.e. HIDEN=0), then the exception is handled at privilege mode EL1 at step S220. In other words, if the exception is not a stage two fault and the exception should be handled at privilege mode EL2 but such execution is not permitted, then the exception is rerouted to privilege mode EL1.

If, however, at step S210, it is determined that the exception is a stage two fault, then flow proceeds to step S235, where it is determined whether or not execution of debug instructions is permitted in the hypervisor mode. If debug instructions can be executed in the hypervisor mode (i.e. HIDEN=1), then flow proceeds to step S230, where the exception that is a stage two fault is handled at privilege mode EL2. In other words, if a stage two fault is raised and if debugging at the hypervisor mode of execution is allowed, then the exception is handled at privilege mode EL2.

Alternatively, if execution of debug instructions is not permitted in the hypervisor privilege mode EL2 (i.e. HIDEN=0), then information about the stage two fault is stored at step S240 and the exception is handled at privilege mode EL1 at step S220 by raising a new exception at privilege mode EL1.

Accordingly, it can be seen how, when in a debug state, the privilege mode at which a particular exception is handled is determined based on the type of the exception (in particular whether or not the exception is a stage two fault), the privilege mode at which the exception is intended to be handled, and whether or not debugging of the hypervisor is permitted (e.g. the value of HIDEN).

Figure 4:
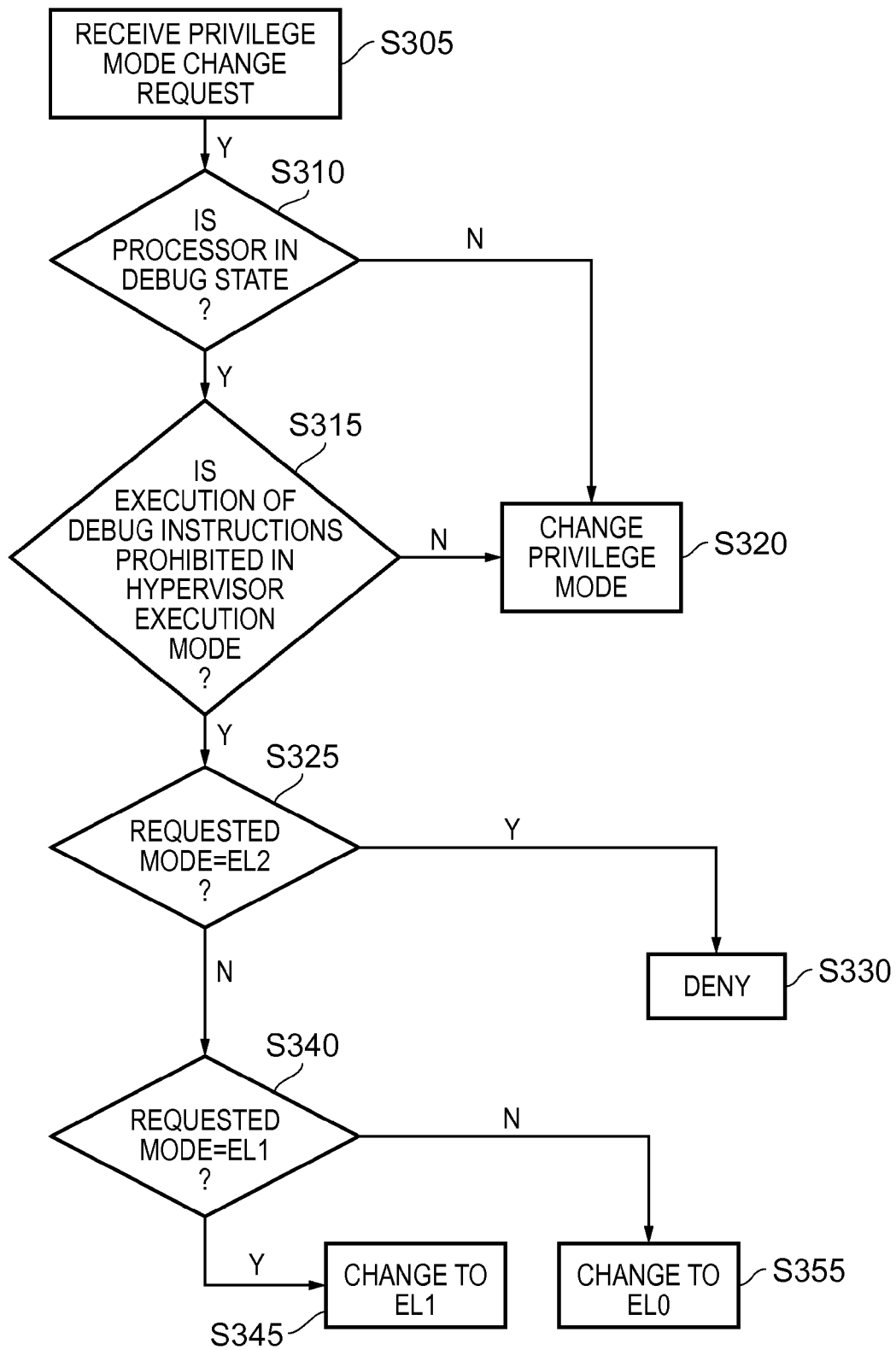
FIG. 4 is a flow chart illustrating the effect of the control parameter on receiving a request to change the privilege level in accordance with one embodiment.

FIG. 4 illustrates a flow chart 300 that indicates how a request to change the privilege mode is received and responded to in accordance to one embodiment.

The process begins at step S305 in which the request to change the privilege mode is received by processing circuitry 105 (e.g. triggered by an instruction executed by the processing circuitry 105 or by an external interrupt signal received by signalling circuitry 155). At step S310, it is determined whether or not the processing circuitry 105 is in a debug state. If the processing circuitry 105 is not in a debug state then at step S320, the privilege mode is changed in accordance with the received request. This is because if not in a debug state then the situation in which debugging and execution in the predefined privilege mode happen simultaneously has not arisen.

Alternatively, if the processing circuitry 105 is in a debug state, then at step S315, the value of HIDEN is considered. If HIDEN is equal to one, indicating that execution of debug instructions is not prohibited in the hypervisor execution mode, then at step S320, the privilege mode is changed to the requested privilege mode.

Alternatively, if debugging is disabled at the hypervisor privilege mode (i.e. HIDEN is zero), then at step S325 it is determined whether or not the requested privilege mode is EL2. If the requested privilege mode is EL2, then at step S330, the request is denied. In other words, if execution of debug instructions is not permitted at privilege mode EL2, and if the requested privilege mode is EL2, and if the processing circuitry 105 is already in a debug state, then request is simply disregarded.

Alternatively, if at step S325 it is determined that the privilege mode is not EL2, then at step S340 it is determined whether or not the requested privilege mode is EL1. If the requested privilege mode is EL1, then the privilege mode is changed to EL1 at step S345. In other words, even if debugging of the hypervisor privilege mode is disabled (HIDEN=0), then if the requested privilege mode is EL1 (i.e. a guest operating system mode), then it is acceptable to change the privilege mode to EL1.

Alternatively, if at step S340, it is determined that the requested privilege mode is not EL1, then the flow proceeds to step S350. It is implicit at step S350 in the embodiment shown in FIG. 4, that the requested mode is EL0. Also, since requests for changing to a host application at EL0 typically come from the hypervisor at EL2, and the processor cannot be at the hypervisor exception level EL2 when in the debug state, then this means the request is not in relation to a host application, and so at step S355, the privilege mode is changed to EL0.

Alternatively, if a host application is executing at step S350 then at step S330, the request to change privilege mode is denied. In other words, if debugging in the hypervisor privilege mode is disabled (i.e. HIDEN=0) then debugging is not permitted for the host applications. This is because there is no mechanism for handling an exception that may occur as a result of handling the debug instruction and furthermore debugging of a host application that runs directly underneath the hypervisor may be deemed to be insecure.

Figure 5:
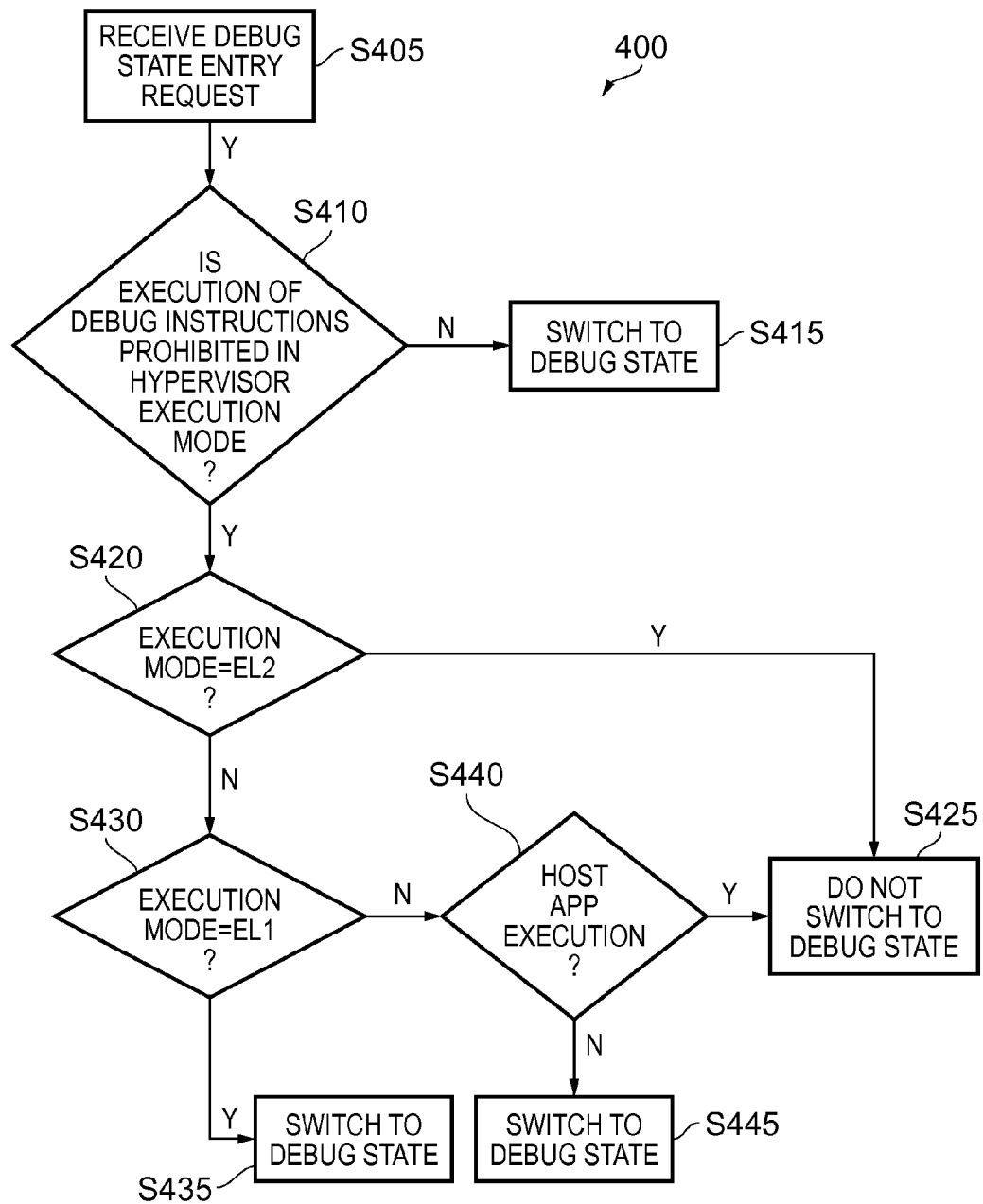
FIG. 5 is a flow chart illustrating the effect of the control parameter on receiving a request to enter a debug state in accordance with one embodiment.

FIG. 5 illustrates a flow chart 400 that indicates how a request to enter the debug state is received and responded to in accordance to one embodiment.

The process begins at step S405 in which the debug state request (which may be an instruction passed via the debug interface 115, or another signal) is received by processing circuitry 105. At step S410, the value of HIDEN is considered. If HIDEN is equal to one, indicating that execution of debug instructions is not prohibited in the hypervisor execution mode, then at step S415, the processing circuitry 105 enters the debug state in accordance to the received request.

Alternatively, if debugging is disabled at the hypervisor privilege mode (i.e. HIDEN is zero), then at step S420 it is determined whether or not the current privilege mode (i.e. execution mode) is EL2. If the current privilege mode is EL2, then at step S425, the request is denied and the processing circuitry 105 does not acquire the debug state. In other words, if execution of debug instructions is not permitted at privilege mode EL2, and if the current privilege mode is EL2, then the processing circuitry is prevented from entering the debug state.

Alternatively, if at step S420 it is determined that the current privilege mode is not EL2 then at step S430 it is determined whether or not the current privilege mode is EL1. If the current privilege mode is EL1, then the debug state is entered at step S435. In other words, even if debugging of the hypervisor privilege mode is disabled (HIDEN=0), then if the current privilege mode is EL1 (i.e. a guest operating system mode), then it is acceptable to enter a debugging state.

Alternatively, if at step S430, it is determined that the current privilege mode is not EL1, then the flow proceeds to step S440. It is implicit at step S440 in the embodiment shown in FIG. 4, that the current privilege mode is EL0. Accordingly, at step S440 it is determined whether or not a host application is currently executing on the processing circuitry 105. If not, then at step S445, the processing circuitry 105 acquires the debug state.

Alternatively, if a host application is executing at step 440 then at step S425, the request to enter the debug state is denied. In other words, if debugging in the hypervisor privilege mode is disabled then debugging is not permitted for the host applications. This is because there is no mechanism for handling an exception that may occur as a result of handling the debug instruction and furthermore debugging of a host application that runs directly underneath the hypervisor may be deemed to be insecure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
a debug interface to receive instructions from a debugger;
processing circuitry to, in a debug state, execute instructions received from the debug interface;
control circuitry to, if a control parameter has a predefined value, prohibit execution of instructions in a predefined privilege mode while in the debug state; and
signalling circuitry to, in response to a first exception to be handled at the predefined privilege mode being signalled while in the debug state and the control parameter having the predefined value, signal a second exception to be handled at a different privilege mode, and to set information identifying a type of the first exception.

2. An apparatus according to claim 1,
wherein, if the control parameter has the predefined value and if the processing circuitry is in the debug state, the control circuitry prohibits the processing circuitry from changing to the predefined privilege mode.

3. An apparatus according to claim 1,
wherein, if the control parameter has the predefined value and if the processing circuitry is in the predefined privilege mode, the control circuitry prohibits the processing circuitry from entering the debug state.

4. An apparatus according to claim 1,
wherein the predefined privilege mode has a higher level of privilege than the different privilege mode.

5. An apparatus according to claim 1, comprising:
a status register to store the information identifying the type of the first exception,
wherein the status register is accessible to the debug interface.

6. An apparatus according to claim 1,
wherein the information identifying the type of the first exception comprises a value corresponding to an exception that could not otherwise occur in the debug state.

7. An apparatus according to claim 6,
wherein the information identifying the type of the first exception comprises an identifier of a debug exception generated in response to a debug event.

8. An apparatus according to claim 1,
wherein the first exception relates to a memory fault.

9. An apparatus according to claim 1,
wherein the first exception relates to a memory translation fault.

10. An apparatus according to claim 1,
wherein the first exception is raised as a result of attempting a second translation from an intermediate address to a physical address after having performed a first translation from a virtual address to the intermediate address.

11. An apparatus according to claim 10, further comprising:
a first memory management unit to perform the first translation based on first configuration data set by the processing circuitry in response to software executing at a less privileged mode than the predefined privileged mode; and
a second memory management unit to perform the second translation based on second configuration data set by the processing circuitry in response to software executing at the predefined privileged mode.

12. An apparatus according to claim 1,
wherein the predefined privilege mode is a hypervisor privilege mode; and
wherein the different privilege mode is a guest operating system privilege mode.

13. An apparatus according to claim 1,
wherein the predefined privilege mode includes a hypervisor privilege mode and a mode for execution of applications directly under software executing in the hypervisor privilege mode; and
wherein the different privilege mode is a guest operating system privilege mode.

14. An apparatus according to claim 12,
wherein, if the processing circuitry is in the debug state and the control parameter does not have the predefined value, the control circuitry is to allow the processing circuitry to enter the predefined privilege mode.

15. An apparatus according to claim 1,
wherein in response to a third exception to be handled at the predefined privilege mode being signalled when the processing circuitry is in the debug state and the control parameter does not have the predefined value, the signalling circuitry is to signal a fourth exception to be handled at the different privilege mode, and not to set information identifying the type of the third exception.

16. A method of operating processing circuitry having a debug state for executing instructions received from a debug interface, wherein, if a control parameter has a predefined value, the processing circuitry is prohibited from executing instructions in a predefined privilege mode while in the debug state, the method comprising the steps:
receiving a signal indicating that a first exception to be handled at the predefined privilege mode has been raised;
if said signal indicating that the first exception has been raised is received when the processing circuitry is in the debug state and the control parameter has the predetermined value, signalling a second exception to be handled at a different privilege mode; and
setting information identifying a type of the first exception.

17. An apparatus comprising:
a debug interface means for receiving instructions from a debugger means;
processing means for, in a debug state, executing instructions received from the debug interface means;
control means for prohibiting execution of instructions in a predefined privilege mode while in the debug state if a control parameter has a predefined value; and signalling means for signalling, in response to a first exception to be handled at the predefined privilege mode being signalled while in the debug state and the control parameter having the predefined value, a second exception to be handled at a different privilege mode, and setting information identifying a type of the first exception.

\* \* \* \* \*